United States Patent Office 3,528,219
Patented Sept. 15, 1970

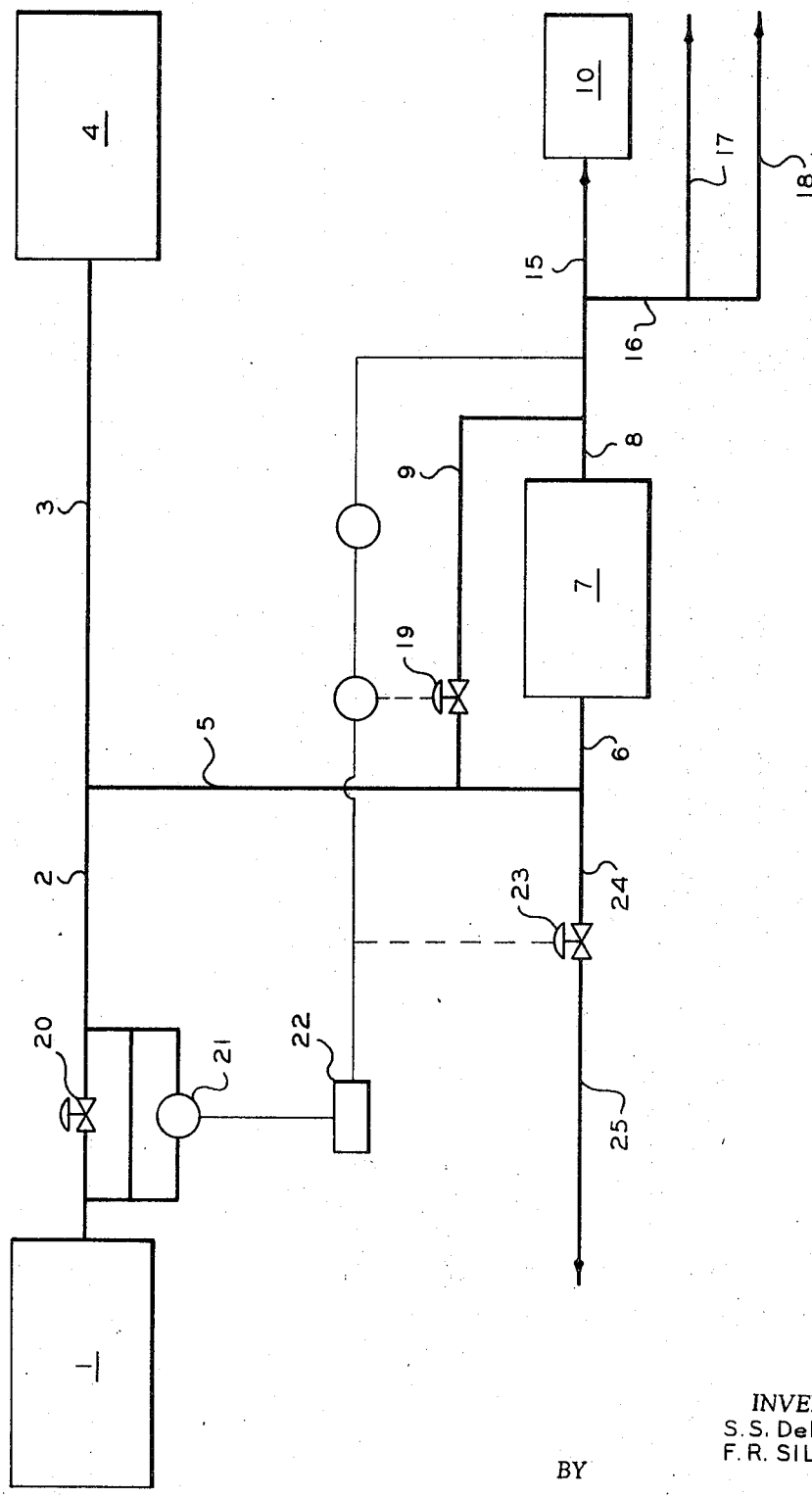

3,528,219
PRESSURE CONTROL SYSTEMS
Sal S. DeMarco, Bartlesville, Okla., and Frank R. Silva, Jr., Elkhart, Kans., assignors to Phillips Petroleum Company, a corporation of Delaware
Filed Nov. 7, 1968, Ser. No. 774,140
Int. Cl. B01d *53/00*
U.S. Cl. 55—66                                                                 6 Claims

ABSTRACT OF THE DISCLOSURE

A method of controlling a first operating process discharging a process stream to a second operating process which involves establishing a pressure drop in the discharge line and regulating the by-pass around a compressor to discharge to a third operating pressure in response to changes in the pressure drop.

---

This invention relates to process control systems.

In one of its more specific aspects, this invention relates to a method of maintaining a process operating pressure at essentially constant value during periods of operational upset in one of a plurality of operationally integrated processes.

In commercial operation, it frequently happens that one operation, or process, prepares a product which is subsequently further processed in another operation. Such operations are usual in a petroleum refining plants in which, for example, the preliminary purification of a hydrocarbon stream is made in one operation with the product therefrom being routed to the subsequent operation. Such processes are generally integrated such that the product being fed to the second process from the first process can be routed to a third process or vented to atmosphere during periods of unacceptance of the product by the second process.

It frequently occurs that if a gaseous produt is routed from the first process to the second process and a period of nonacceptance of this product by the second process begins, a compressor is placed in operation, this compressor being depended upon to transmit the product to the third process. This compressor will operate continuously but during periods of normal operation operates under recycling conditions. It is automatically placed in operation during periods of product nonacceptance by the second process to transmit the product to the third process. However, it frequently happens that the nonacceptance of the product by the second process upsets the operation of the first process and before the operation of the compressor can become effective, that is, before the by-pass control valve can be closed causing the compressor to discharge to the third process, large quantities of the product material from the first process must be vented or lost or temporary upset of the first process must be tolerated.

There has now been developed a control system which places into operation the normally recycling compressor in such a manner as to prevent any deleterious effect upon the operation of the first process. According to this invention there is provided a method of maintaining stable operation of a first process, the roduct of which is routed to a second process, during periods of operational upset of the second process which comprises establishing an original pressure drop in the flow of the product from the first to the second process, sensing the established pressure drop, establishing flow from the first process to a first locus in response to a first variation in the established pressure drop, establishing flow from the first process to a second locus in response to a second variation in the established pressure drop and reestablishing flow from the first process to the second process upon reestablishment of the original pressure drop.

In one embodiment of this invention, flow is first established to a third process upon decrease of the established pressure drop to within a specific range and is then established, or vented, to atmosphere upon a further decrease in the established pressure drop.

Accordingly, it is an object of this invention to provide an improved control system.

It is another object of this invention to provide a control system which permits proved operational integration of a plurality of units.

The invention will be more easily understood if explained in conjunction with the attached drawing which illustrates the application of this invention to a helium recovery system, the first unit of which is a low purity recovery unit, the second unit of which is a high purity recovery unit, the third unit being an interconnected unit capable of taking the product from the first low pressure recovery unit during abnormal periods of operation when the product from the low pressure recovery unit cannot be accepted by the high pressure recovery unit. It is understood that the explanation in conjunction with the helium recovery system is not intended to limit the method of the invention to such processes.

Instrument signals and responses are conventional within the art and the discussion will be limited to an explanation of causes and effects other than to the detailed discussion of the instrument signalings, their transmittals, air outputs, and the like.

Referring now to the attached figure, unit 1 is a crude helium separation process producing a product normally routed through conduits 2 and 3 to helium purification recovery process 4. During such periods as unit 4 is unable to accept the product from process 1, the product is routed through conduits 5 and 6 to compressor 7. During normal operation, compressor 7 is operated continuously with valve 19 and recycle line conduit 9 from discharge conduit 8 to suction conduit 6 open so as to minimize the amount of material discharged to the third process 10 through conduits 8 and 15, although some discharge may be made into manifold 16 and to subsequent use through conduits 17 and 18.

The operation of this system, in the absence of the employment of this invention, is such that upon cessation of operation in process 4, the pressure builds up in process 1 and unless relieved, the operation of process 1 will become such as to produce off-specification product. Conventional operation is such that with the cessation of operation of process 4, a pressure regulator in conduit 2 is adapted to close the bypass valve 19 in bypass conduit 9, thus causing compressor 7 to discharge material from line 2 to process 10 through conduits 8 and 15. However, such a system responds too slowly to prevent upsetting process 1.

In actual operation, the pressure control valve controlling process 1 is designed for a certain pressure drop across it. Decreases in the pressure downstream of this control valve can, in certain processes, sufficiently alter this pressure drop so that the pressure of the process controlled is upset sufficiently to adversely effect the operations of the system controlled. For this reason, it is important that the pressure drop across the valve be varied as little as possible.

The method of this invention involves closing the recycle valve 19 in response to changes in the pressure drop across a pressure control valve 20 installed in conduit 2. With upset condition in process 4, such that process 4 cannot accept all the product from process 1, the pressure in conduit 2 downstream of valve 20 tends to increase with the result that the pressure drop across the valve tends to decrease. Upon a decrease in this pressure drop to a specified value, pressure drop indicating controller 21 transmits a signal through transmitter 22 closing control valve 19 thus effecting discharge from compressor 7 through conduit 8 and through conduit 15 to process 10.

However, this may be insufficient to prevent further pressure build-up in conduit 2 and accompanying decrease of pressure drop across valve 20. Accordingly, to further relieve the pressure, upon further decrease in the pressure drop across valve 20, with valve 19 now fully closed and all possible discharge being made from conduit 2 through conduits 8 and 15 to unit 10, valve 23 in conduit 24 is caused to open thus venting additional materials through conduit 25 to some low pressure relief, such as the atmosphere.

The system restores the desired operation upon the resumption of operations by process 4. With resumption of operations, the pressure drop across valve 20 begins to increase. Thereupon, valve 23 closes, discontinuing the venting of the system to the atmosphere. Upon further increase in the pressure drop across valve 20, valve 19 in compressor bypass line conduit 9 begins to open and continues to open with increase in pressure drop across valve 20 until stabilized operations are again established.

The ranges of response at which the various valves operate will depend upon the system pressure. For example, in the helium recovery system of the example, process 1 operates at about 250 p.s.i.g. and process 2 operates at about 235 p.s.i.g. Compressor 7 discharges at about 900 to about 1000 p.s.i.g. The valves within the system are so regulated that valve 19 in the recycle line around compressor 7 was set to begin to close at a pressure drop across valve 20 of about 10 p.s.i. and to be completely closed at a pressure drop of about 5 p.s.i. At this point, valve 23 in conduit 24 began to open and was completely open at a pressure drop across valve 20 of about 0 p.s.i. Upon resumption of satisfactory operation of unit 4, valve 23 began to close at a pressure drop across valve 20 of slightly over 0 p.s.i. and was completely closed at 5 p.s.i. at which point valve 19 began to open, being completely open at 10 p.s.i., at which point normal satisfactory operations had been restored.

It will be appreciated that within the scope of this invention similar systems can be established in which the sensed pressure relationship increases, rather than decreases during the periods of operational upset. It will be further appreciated that the system can be operated without the inclusion of transfer means of any sort; that is, within a certain level of pressure relationship between two points within the system, flow is routed, in the absence of a compressor, to a lower pressure point; upon further change in the related pressure points, a further venting can be made, either to a point of greater acceptance capacity for the material vented or to a point of less pressure than that point to which the first venting was made.

It will be evident that certain variations can be made to this invention as described. However, such are not considered as being outside the scope of the invention.

What is claimed is:

1. A method of maintaining a uniform pressure within a first operating system discharging into a second operating system upon irregularity of operating conditions within the second operating system which comprises sensing a pressure relationship between two dissimilar points within the discharge from the first system to the second system, establishing discharge from the first system to a third system in response to a first variation in the sensed pressure relationship, establishing discharge from the first system to a fourth system in response to a second variation in the sensed pressure relationship and reestablishing discharge from the first system to the second system upon reestablishment of the originally sensed pressure relationship.

2. The method defined in claim 1 in which the sensed pressure relationship is a pressure drop between two points within the discharge conduit from the first to the second system.

3. The method defined in claim 1 in which the third system is maintained at a pressure less than that of the first and second system and the fourth system is maintained at a pressure less than that of the third system.

4. The method defined in claim 1 in which transfer means are employed to discharge from the first system to the third system.

5. The method defined in claim 1 in which the first system is a crude helium separation process and the second system is a helium purification process.

6. The method defined in claim 5 in which the pressure relationship sensed is in a conduit transferring product from the first system to the second system, the discharge from the first system being conveyed to the third system by compression means, the fourth system being under atmosphere pressure.

References Cited

UNITED STATES PATENTS 3,375,845    4/1968    Behm _____ 137—110

ALAN COHAN, Primary Examiner

U.S. Cl. X.R.

137—2, 14, 117, 118